May 26, 1959     J. TOBIAS     2,887,960
AUTOMATIC HYDRAULIC TRANSMISSION
Filed Nov. 23, 1955     10 Sheets-Sheet 1
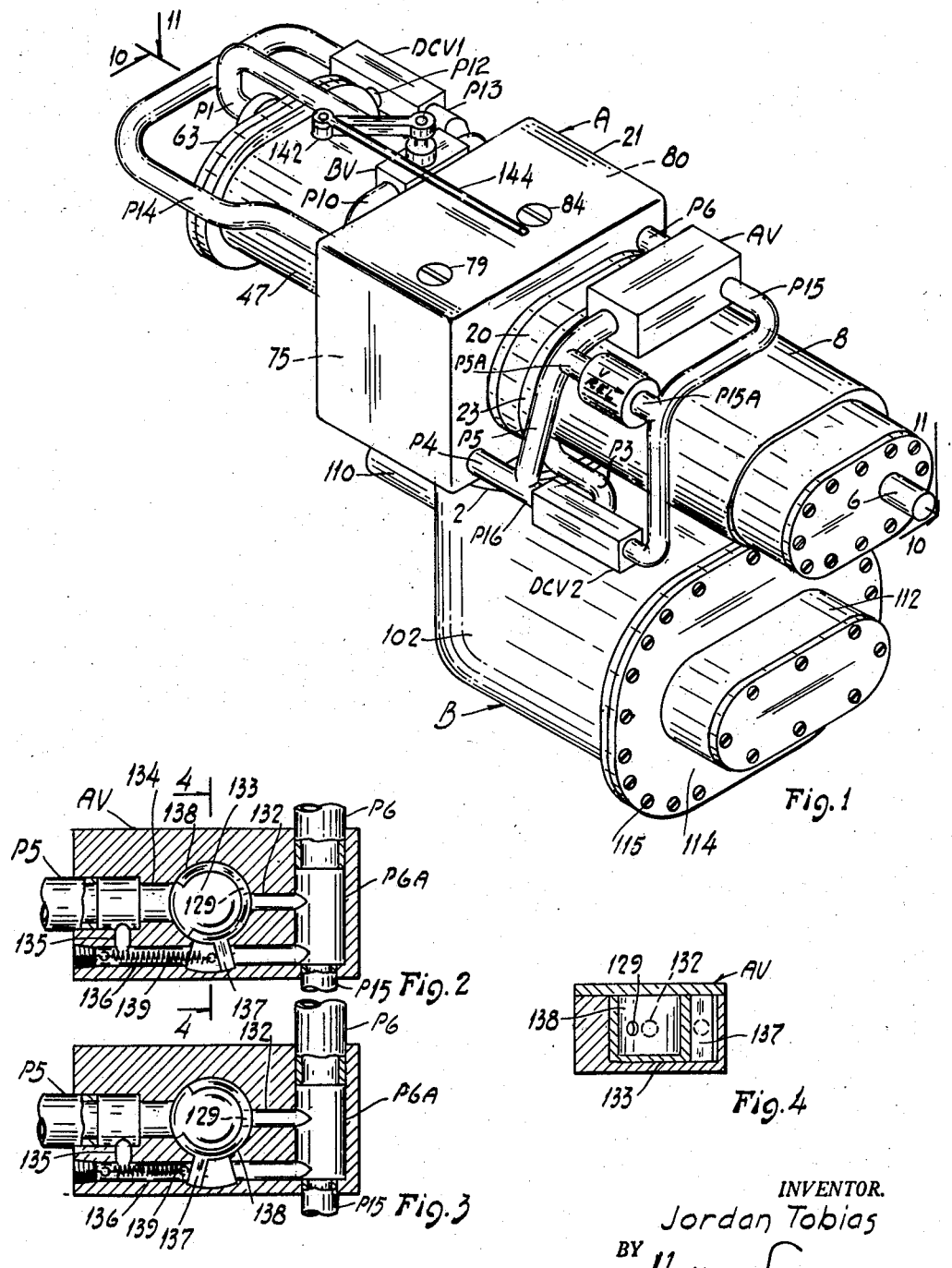
INVENTOR.
Jordan Tobias
BY Harry Sangsam
Attorney

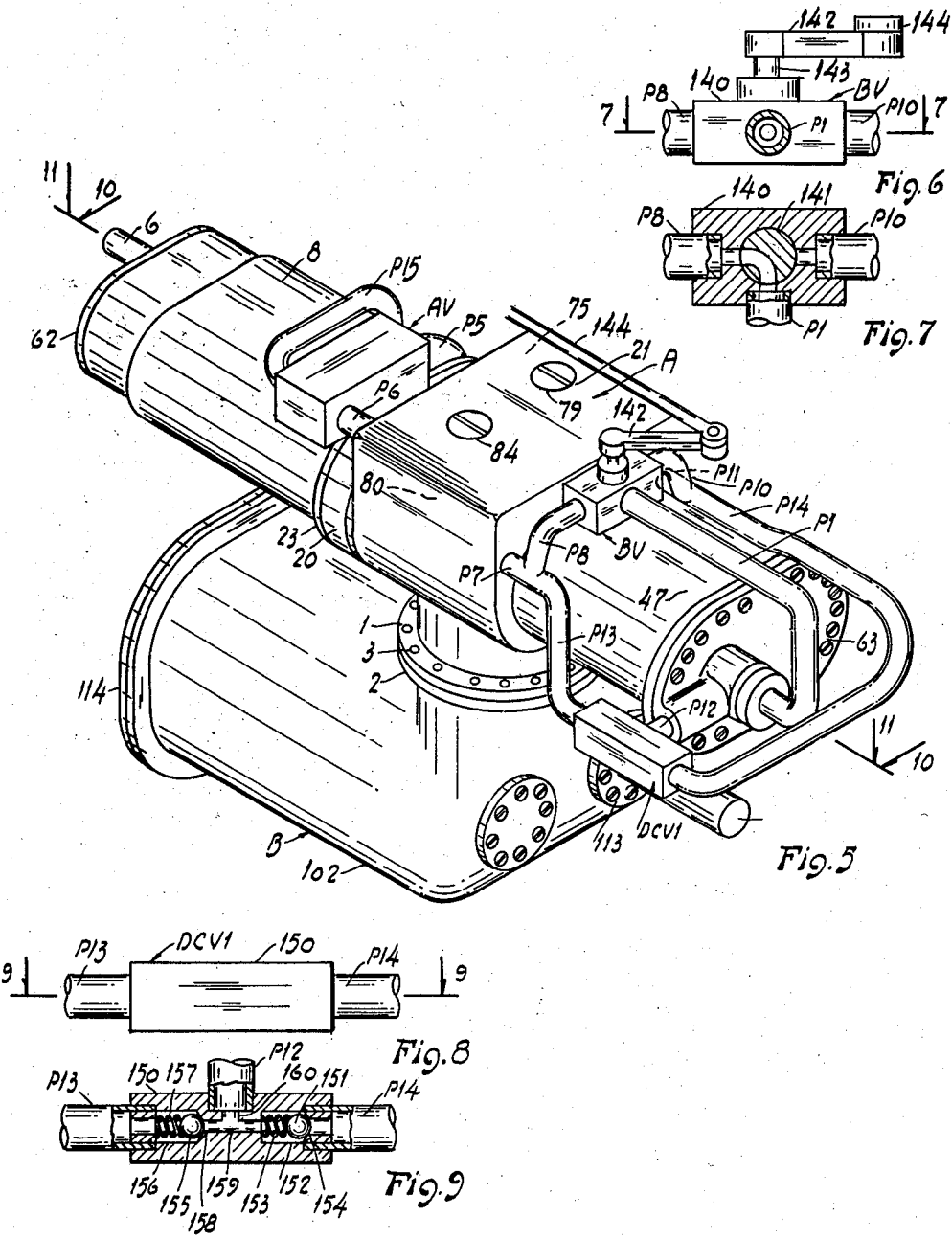

INVENTOR.
Jordan Tobias
BY Harry Sangsam
Attorney

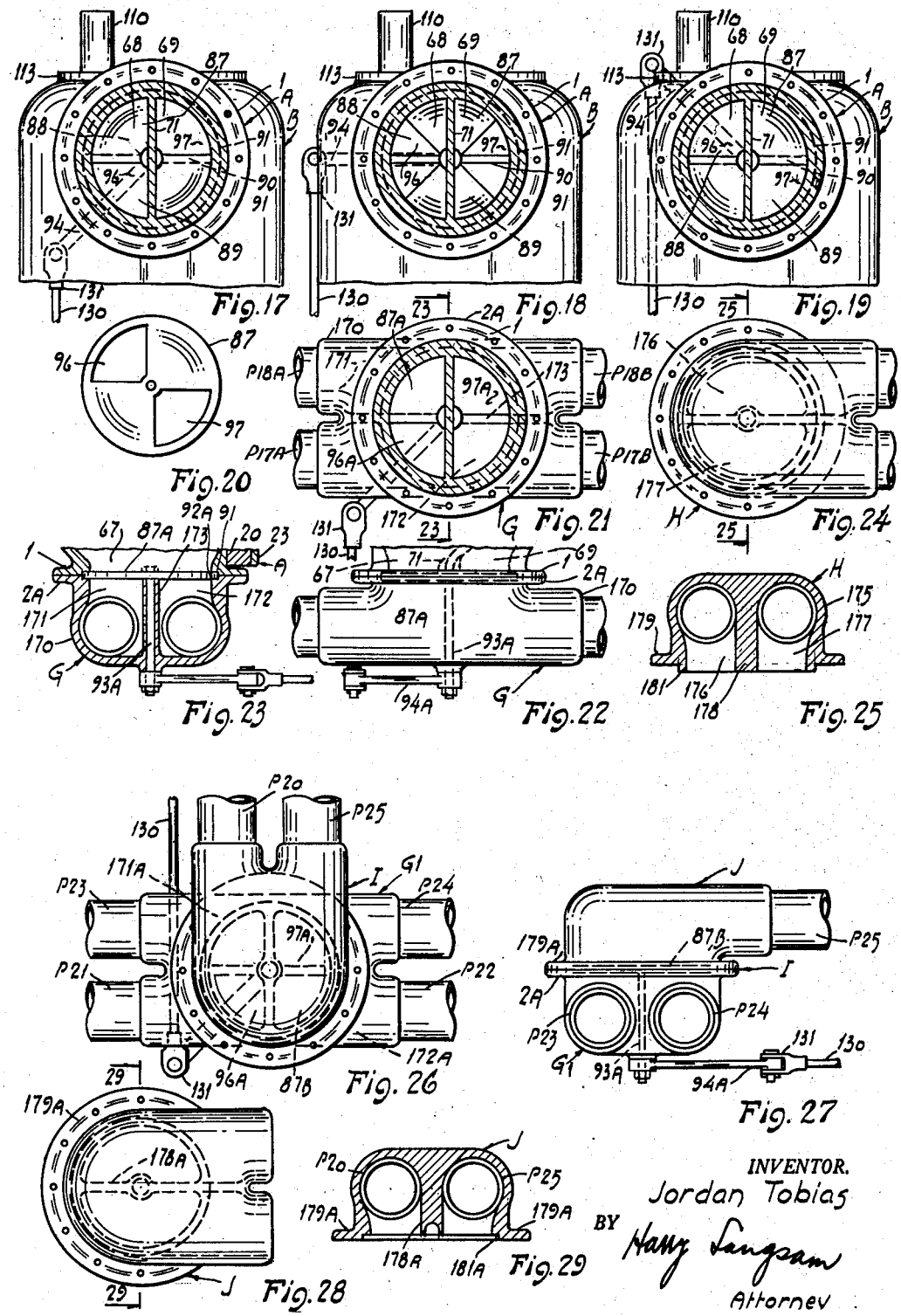

May 26, 1959 J. TOBIAS 2,887,960
AUTOMATIC HYDRAULIC TRANSMISSION
Filed Nov. 23, 1955 10 Sheets-Sheet 9

INVENTOR.
Jordan Tobias
BY
Attorney

May 26, 1959 J. TOBIAS 2,887,960
AUTOMATIC HYDRAULIC TRANSMISSION
Filed Nov. 23, 1955 10 Sheets-Sheet 10

INVENTOR.
Jordan Tobias
BY
Harry Langsam
Attorney

2,887,960

AUTOMATIC HYDRAULIC TRANSMISSION

Jordan Tobias, Philadelphia, Pa.

Application November 23, 1955, Serial No. 548,630

3 Claims. (Cl. 103—120)

My invention relates to new and improved methods of power transmission by hydraulic means, and more particularly relates to the transmission of power from a rotating power source (of relatively constant speed) to the rotating traction elements of a vehicle that travels at varying speeds.

In the prior art devices, speed ratio changes between the rotating power source and the rotating traction elements of vehicles has been accomplished in various ways, some of which are: the friction drives employing a rotating disk in contact with a driven wheel, the gear type transmission employing intermeshing gears, two or more of which can be used to transmit power at fixed ratios, and the fluid drives that employ the kinetic energy of a mass of a liquid given momentum by a driven vaned wheel impinging on an associated vaned wheel to transmit the rotating power. All of the foregoing methods of varying ratio power transmissions have characteristics that are objectionable, power consuming, and, in the case of the gear transmission, require disconnecting of the power source when a change from one set of gears to another set of gears is desired, resulting in a non-uniform application of the rotating power to the traction elements of the vehicle.

It is, therefore, the primary object of my invention to devise a power transmission mechanism employing a fluid power transmission mechanism that will permit uniform application of power from a rotating power source to the rotating traction elements of a vehicle at varying speed ratios between the power source and the rotating traction elements of the vehicle.

Another object of my invention is to devise a power transmission mechanism that will permit forward and reverse operation of the rotating traction elements to the end that the vehicle can be driven forward or backward at varying and equivalent rates of speeds.

Another object of my invention is to devise a power transmission that will permit the vehicle to remain at rest while the rotating power source idles without transmitting any power to the rotating traction elements of the vehicle, thereby eliminating the "drifting" characteristic of most fluid drives of the vane type.

Another object of my invention is to devise a variable ratio power transmission mechanism that will automatically adjust the position of the elements of the driving unit to automatically change the speed ratio and mechanical advantage between the driving unit and the driven unit dependent on the load being imposed on the rotating power source.

Another object of by invention is to devise a power transmission that will provide a power ratio proportional to the load requirements of the vehicle traction unit.

Another object of my invention is to devise a variable ratio power transmission mechanism that is automatic in its operation and one wherein the operator is only required to select the direction in which he wishes the vehicle to travel and to regulate the speed of rotation of the power source.

Another object of my invention is to devise a variable ratio power transmission mechanism that will permit the inherent drag of the rotating power source to be used as a braking effect when it is desired to diminish the speed of travel of the vehicle or to restrain the speed of the vehicle when the vehicle is descending an incline.

Another object of my invention is to devise a variable ratio power transmission mechanism comprised of close coupled driving and driven units that can be used as a variable speed ratio transmission for a vehicle, ship, airplane, or power machinery.

Another object of my invention is to devise a variable ratio power transmission mechanism comprised of a driving unit connected by pipes to two or more driven units for the transmission of fluid power to remotely located rotating traction elements of the vehicle.

Another object of my invention is to devise a variable ratio power transmission mechanism comprised of a driving unit and four or more driven units interconnected by pipes in a manner that permits the application of power to all remotely located rotating traction elements of the vehicle.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawings, in which:

Fig. 1 is an isometric view showing the drive shaft end of my improved variable ratio power transmission mechanism and showing the primary or driving unit close coupled to the secondary or driven unit.

Fig. 2 is a sectional plan view of the pressure actuated automatic idling valve used with my improved device; the valve being shown in the closed position.

Fig. 3 is a sectional plan view of the pressure actuated automatic idling valve shown in the valve open position.

Fig. 4 is a sectional view taken along line 4—4 of Fig. 2.

Fig. 5 is an isometric view showing the driven shaft end of my improved power transmission mechanism.

Fig. 6 is an elevational view of the brake controlled valve used with my power transmission mechanism.

Fig. 7 is a plan sectional view taken along line 7—7 of Fig. 6.

Fig. 8 is an elevational view of a dual check valve employed in the piping connections of my transmission mechanism.

Fig. 9 is a plan sectional view taken along line 9—9 of Fig. 8.

Fig. 17 is a plan sectional view taken along line 17—17 of Fig. 10 showing the reversing control valve positioned for driving the vehicle in a forward direction, Fig. 18 is a plan sectional view taken along line 17—17 of Fig. 10 showing the reversing control valve positioned to permit rotation of the power source without transmitting power to the secondary unit (idling).

Fig. 19 is a plan sectional view taken along line 17—17 of Fig. 10 showing the reversing control valve positioned for driving the vehicle in a reverse direction.

Fig. 20 is a plane view of the reversing control valve disk.

Fig. 21 is a plane sectional view of an adapter unit shown coupled to the primary unit and positioned to conduct fluid under pressure to a remotely positioned secondary unit or units.

Fig. 22 is an elevational view of the adapter unit shown in Fig. 21.

Fig. 23 is an elevational sectional view taken along line 23—23 of Fig. 21.

Fig. 24 is a plan view of an adapter unit used with secondary unit when the secondary unit or units are remotely positioned in respect to the primary unit.

Fig. 25 is an elevational sectional view taken along line 25—25 of Fig. 24.

Fig. 26 is a plan view of a reversing control valve assembly adapted for intermediate positioning in the piping connections between the primary units to the secondary units.

Fig. 27 is an elevational view of the reversing control valve assembly shown in Fig. 26.

Fig. 28 is a plan view of the upper unit of the reversing control valve assembly shown in Fig. 26.

Fig. 29 is an elevational sectional view taken along line 29—29 of Fig. 28.

*Primary unit*

Figures 30, 31:
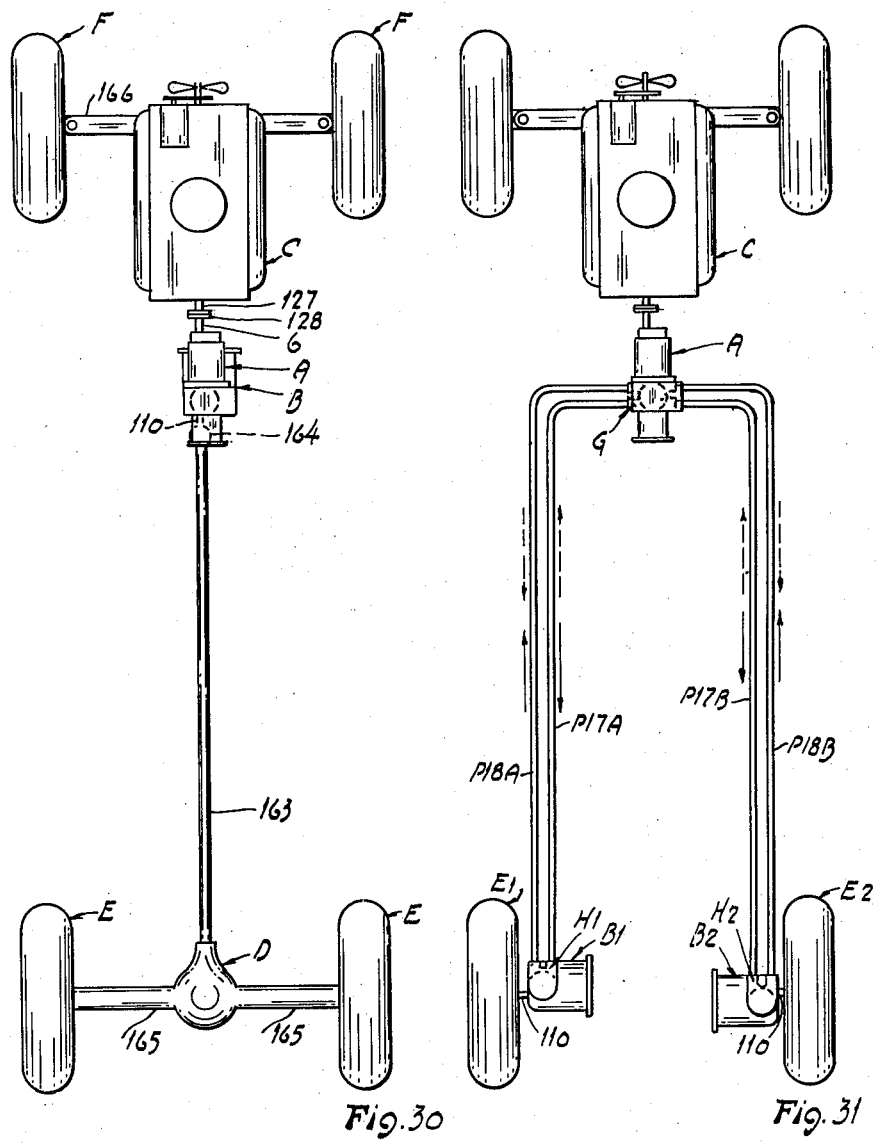
Fig. 30 is a plan view showing my improved variable ratio power transmission mechanism as applied to the traction elements of a motor vehicle, the power transmission mechanism replacing the conventional gear transmission unit or fluid drive transmission unit.
Fig. 31 is a plan view showing the variable ratio power transmission mechanism wherein the primary unit is coupled to the rotating power source and the secondary units are coupled to each of the rear traction elements of a motor vehicle, the units being connected by piping.
Figures 32, 33:
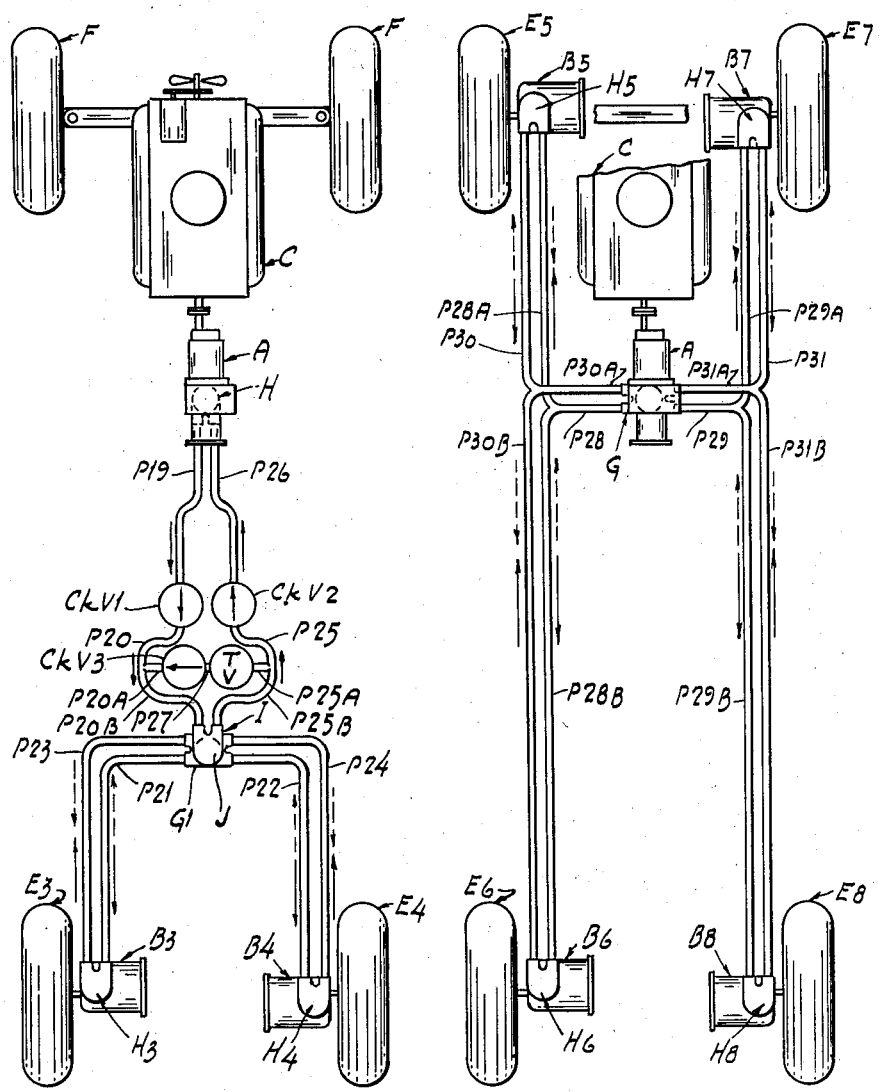
Fig. 32 is a plan view showing the variable ratio power transmission mechanism wherein the primary unit is coupled to the rotating power source and the secondary units are coupled to each of the rear traction elements of a motor vehicle, control means being interposed in the piping connections between the units.
Fig. 33 is a plan view showing the variable ratio power transmission mechanism wherein the primary unit is coupled to the rotating power source and secondary units are coupled to each of the forward and rear traction elements of the motor vehicle, the units being connected by piping.

Referring now in greater detail to the drawings, wherein similar reference characters refer to similar parts, I disclose in Figs. 1 and 5 my improved variable ratio power transmission mechanism comprised of a primary unit, generally designated A, and a secondary unit, generally designated B. In the illustrations, Figs. 1 and 5, the primary unit A and secondary unit B are shown close coupled to each other by the securing flanges 1 and 2 and securing bolts 3. However, it is to be understood that with the use of adapter units, as hereinafter described, and interconnecting piping, the primary unit A and secondary unit B can be made to operate satisfactorily when spaced at a distance from each other as shown in Figs. 31, 32, and 33.

Figure 11:
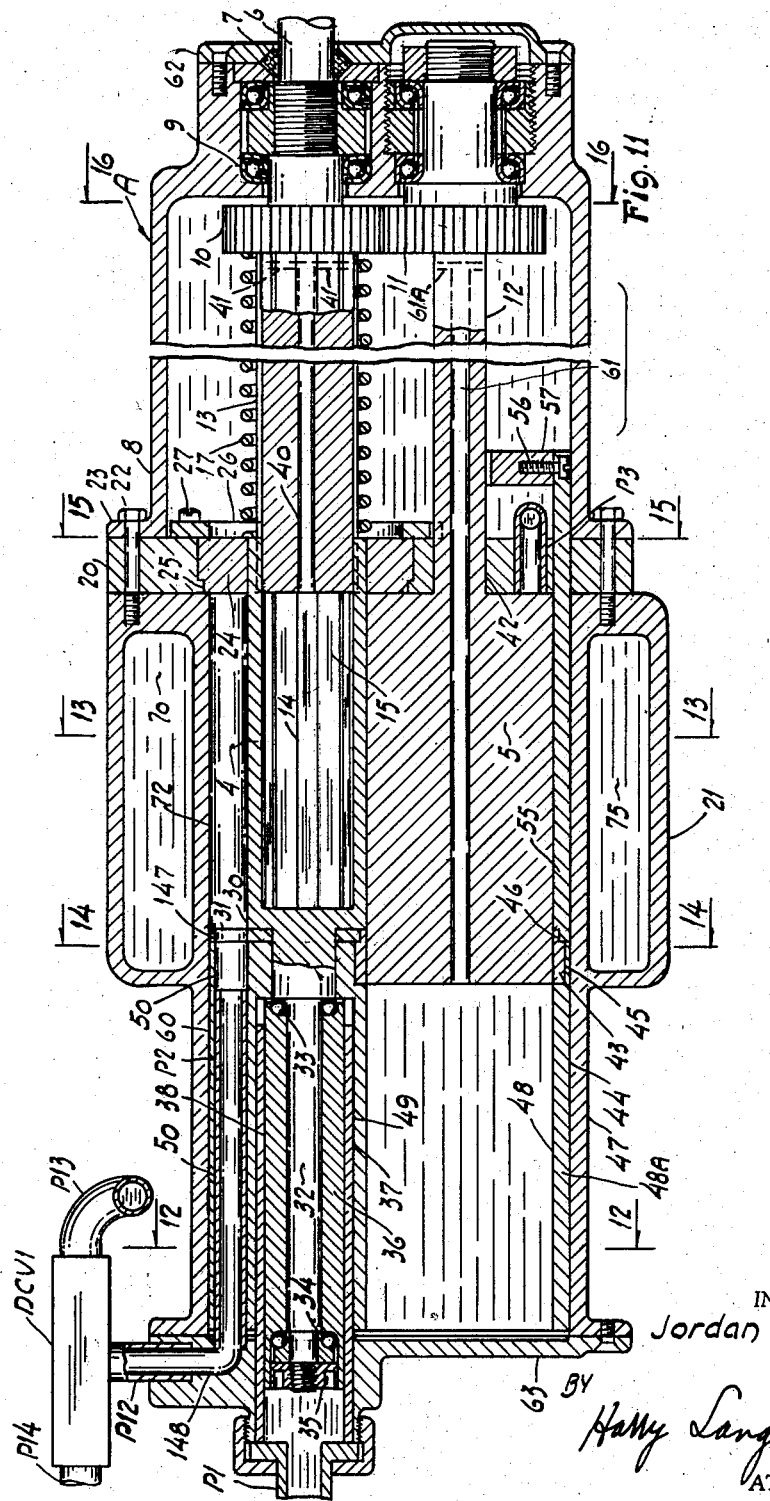
Fig. 11 is a plan sectional view taken along line 11—11 of Figs. 1 and 5.
Figures 12, 13:
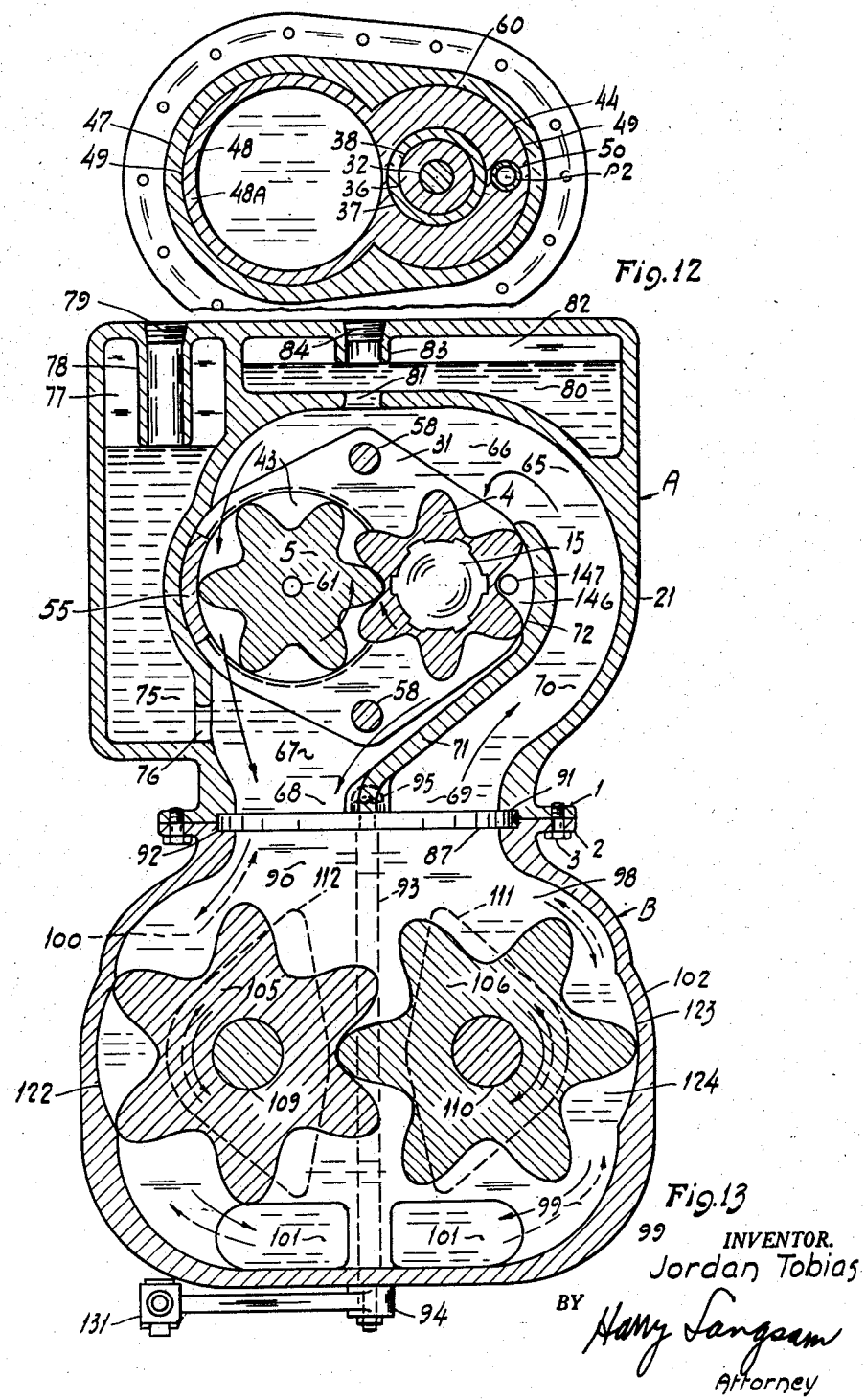
Fig. 12 is an elevational sectional view taken along line 12—12 of Figs. 10 and 11.
Fig. 13 is an elevational sectional view taken along line 13—13 of Figs. 10 and 11.

The primary unit A is essentially a variable capacity gear pump having a longitudinally movable or slidable pump gear 4 and a longitudinally fixed pump gear 5 (see Figs. 11 and 13). The variable capacity, including the end seal and control of the variable capacity are the unique features of my variable capacity gear pump. The driving shaft 6 of the primary unit receives torque force from an internal combustion engine (see Figs. 30, 31, 32, and 33), or other torque producing power source. The driving shaft extends through a seal 7 in a synchronizing gear housing 8 and is positioned by the bearing 9. Fixedly attached to the driving shaft 6 is a synchronizing gear 10 positioned to mesh with a second synchronizing gear 11 which is fixedly attached to the longitudinally fixed pump gear shaft 12. A spline 13 is formed on the inner portion of the driving shaft 6 and is arranged to interfit with grooves 14 formed in a longitudinal cavity 15 in the longitudinal movable pump gear 4. With this interfitting of the spline 13 and grooves in the cavity 15, the longitudinally movable gear 4 is free to move longitudinally on the spline 13 on the driving shaft 6. A helical compression spring 17, surrounding the spline portion 13 of the driving shaft 6, provides a force to retain the longitudinally movable pump gear toward the outer end of the spline portion 13 of the driving shaft 6. The spline end of the driving pump shaft 6 is positioned by the cavity 15 in the longitudinally movable pump gear 4 and torque received by the driving shaft 6 is transmitted to the gear 4 by the spline 13 and interfitting grooves 14 in the cavity 15.

A seal plate 20 is positioned adjacent to the inner end of the synchronizing gear housing 8 and the housing 8 is secured to the sealing plate 20 and gear pump body portion 21 by the bolts 22 that pass through a flange 23 on the inner end of the synchronizing gear housing 8, through the seal plate 20, and are threaded into the end wall of the gear pump body portion 21. The longitudinally movable pump gear 4 is sealed on the end adjacent to the synchronizing gear housing 8, by a closely interfitting longitudinally fixed seal 24, the seal 24 being tained and positioned in the seal plate 20 by an inwardly extending flange 25 on the seal plate 20 and a securing plate 26, the securing plate 26 being secured and positioned by the securing bolts 27 (see Figs. 10 and 11). With this positioning of the longitudinally fixed seal 24, it can readily be observed that the longitudinally movable pump gear 4 is free to rotate together with the seal 24 and is also free to move longitudinally through the seal 24. The seal plate 20 and the rotatable seal 24 are relatively thin in axial direction as compared with the axial length of the slidable gear 4 so that when this gear is moved toward the right as viewed in Fig. 11, it extends through and beyond the seal 24.

Figure 10:
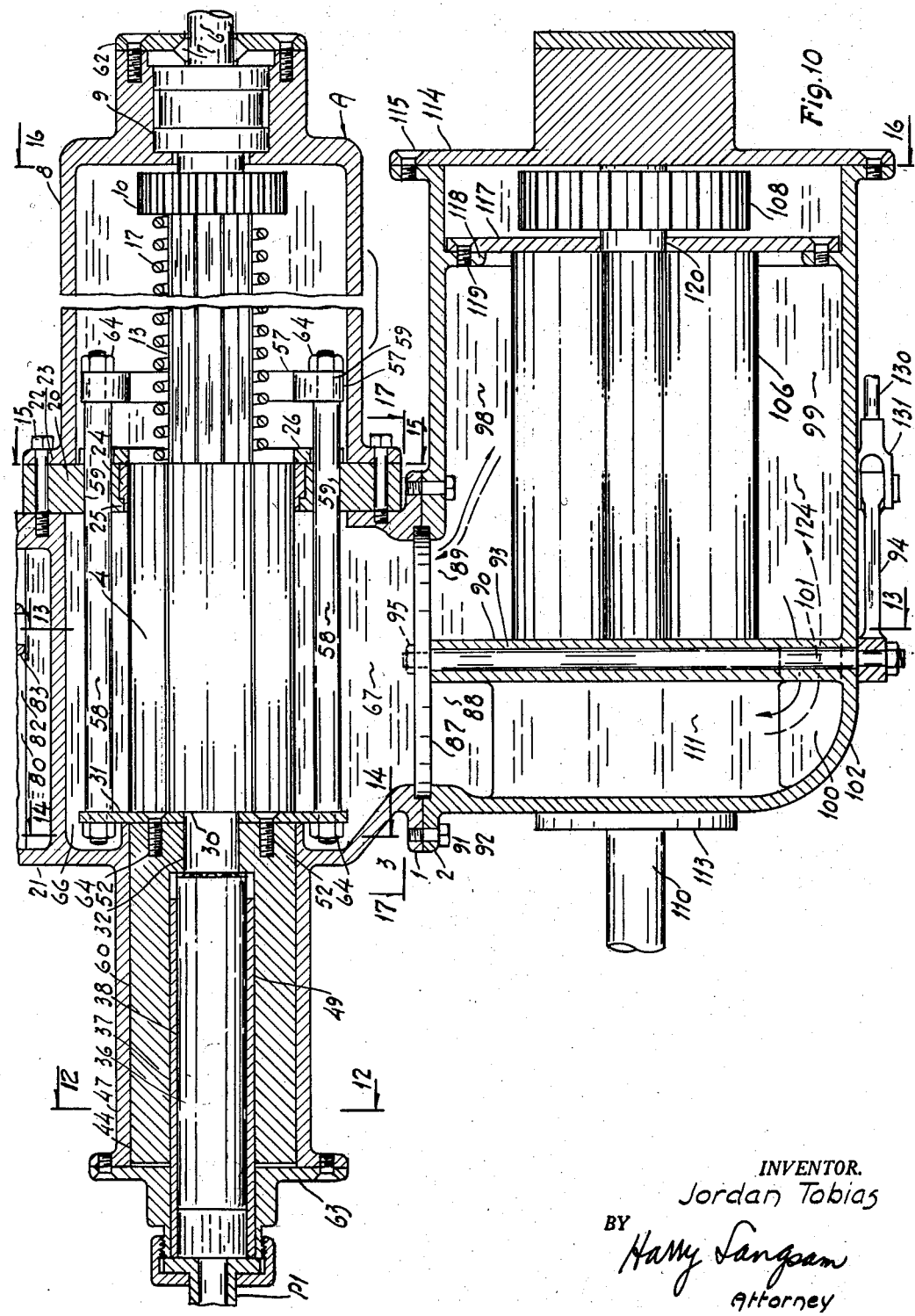
Fig. 10 is an elevational sectional view taken along line 10—10 of Figs. 1 and 5.

The bearing supported end 30 of the longitudinally movable pump gear 4 fits closely against a movable seal plate 31, (see Figs. 10 and 11). A shaft extension 32, part of and fixedly attached to the longitudinally movable pump gear 4, is supported and positioned by the ball type bearings 33 and 34, which are, in turn, positioned and secured by the spanner nut 35 within a longitudinally movable cylindrical bearing support 36. The combination of the bearing support 36, longitudinally movable pump gear shaft extension 32 and the spanner nut 35 form a piston 38 that is free to move longitudinally in the cylinder tube 37 when fluid pressure is applied to the end of the combination by way of the pipe P1, as will be hereinafter described, to force the longitudinally movable pump gear 4 through the longitudinally fixed seal 24 to compress the helical compression spring 17, move the pump gear 4 on the spline portion 13 of the driving shaft 6, and thus reducing the area of the pump gear 4 presented to the fluid being pumped, and thus reduce the pumping capacity of the longitudinally movable pump gear 4. As the longitudinally movable pump gear 4 moves on the spline 13, fluid entrapped within the longitudinal cavity 15 of the pump gear 4 is free to move out of the cavity 15 by way of the longitudinal hole 40 and weep holes 41—41 in the driving shaft 6, and thus into the interior of the synchronizing gear housing 8, thereby reducing hydraulic resistance to the movement of the pump gear 4.

Figure 14:
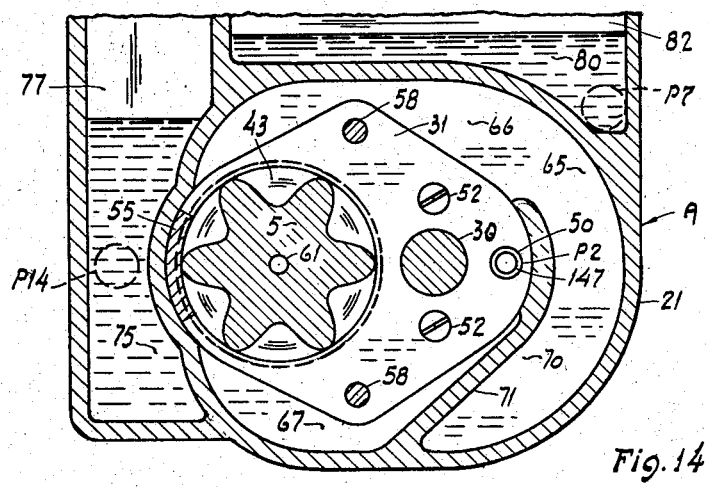
Fig. 14 is an elevational sectional view taken along line 14—14 of Figs. 10 and 11.
Figure 15:
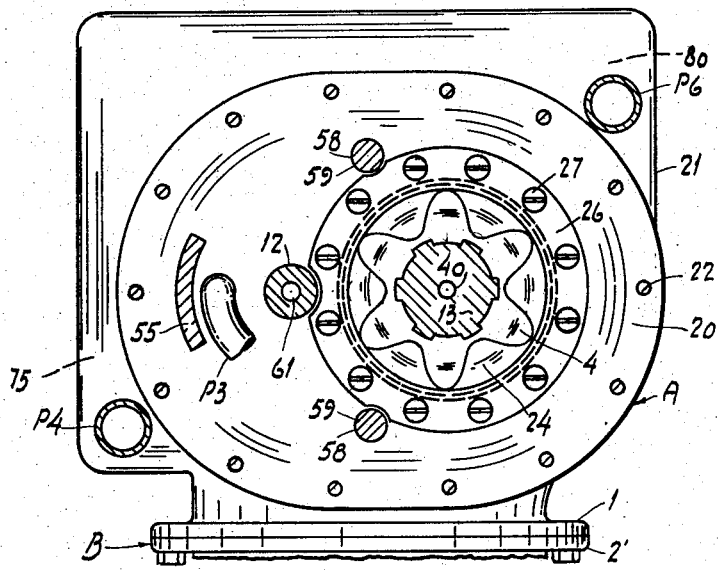
Fig. 15 is an elevational sectional view taken along line 15—15 of Figs. 10 and 11.

The longitudinally movable pump gear 4 and the longitudinally fixed pump gear 5 are retained in controlled synchronized space relationship to each other by the synchronizing gears 10 and 11 respectively, which are fixedly attached to the shafts 6 and 12 respectively. The horizontally movable pump gear 4 is rotatably fixed to the driving shaft 6 by the spline 13 interfitting with the grooves 14 in the cavity 15, as described above, and the horizontally fixed pump gear is fixedly attached to the horizontally fixed pump gear shaft 12 which passes through a hole 42 in the seal plate 20. The inner end of the horizontally fixed pump gear 5 is positioned to interfit with and be sealed by a longitudinally movable seal 43. The seal 43 is positioned by and is free to rotate in a seal carriage 44 and is retained in an annular groove 45 in the face of the seal carriage 44 by the movable seal plate 31 which interfits with an annular rabbet 46 in the face of the longitudinal movable seal 43 (see Figs. 10, 11 and 14). With this positioning of the longitudinally movable seal 43, it can readily be observed that the rotatably mounted seal 43, together with the seal carriage 44 can move over the face of the longitudinally fixed pump gear 5 without interfering with the rotation of the pump gear 5. A bore 48 extending longitudinally through the seal carriage 44 is provided to receive the free end of the longitudinally fixed pump gear 5 when the seal carriage 44, together with the seal 43, move along the longitudinally fixed pump gear 5. The rotatable seal 43 is relatively thin in axial direction as compared with the axial length of the fixed gear 5 so that when the seal 43 is moved toward the right as viewed in Fig. 11, the fixed gear 5 extends through and beyond the seal 43.

The seal carriage 44 is positioned to fit snugly in the seal carriage housing 47 (see Fig. 12), and is shaped in the form of two intersecting cylinders. The larger of the two cylinders forms a tube 48A whose inside diameter is a bore 48 that neatly fits the outside diameter of the longitudinally fixed pump gear 5, and is positioned to receive the longitudinally fixed pump gear 5, as described above.

Figure 16:
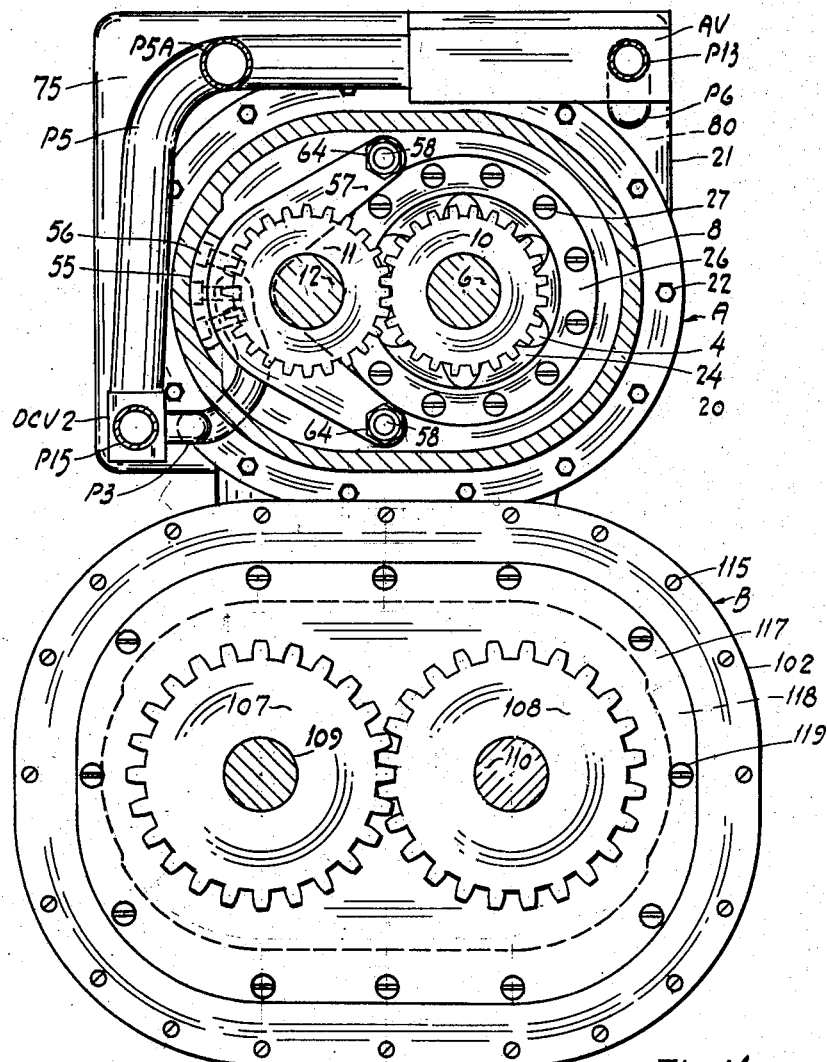
Fig. 16 is an elevational sectional view taken along line 16—16 of Figs. 10 and 11.

A smaller intersecting cylinder 60 contains a cylinder tube bore 49 positioned to interfit with the cylinder tube 37 (see Figs. 10, 11, and 12), and an equalizer pipe bore 50, positioned to interfit with a fluid relieving and replenishing pipe P2. When the longitudinally movable cylindrical bearing support 36, together with its components forming the piston 38, moves the longitudinally movable pump gear in the direction of the drive shaft 6 due to fluid pressure from the pipe P1, as described above, the support 36, being positioned on the shaft 32 by the ball bearings 33 and 34, also forces the seal carriage housing in the direction of the drive shaft 6. The components-cylinder tube 37, seal carriage 44, seal 43, movable seal plate 31, and longitudinally movable pump gear 4, all move in unison. The movable seal plate 31 is fixedly attached to the seal carriage 44 by the securing screws 52—52 (see Fig. 10). Another member of the directly above described combination is the horizontally movable pump gear side seal 55 (see Figs. 11, 13, 14, 15, and 16). The side seal is fixedly attached to the movable seal plate 31 and extends in a direction parallel to the axis of the longitudinally fixed pump gear 5. The inner concave face of the seal 55 interfits with the tip diameter of the gear teeth on the longitudinally fixed pump gear 5 (see Fig. 13), and its outer convex face fits snugly against the side wall of the gear pump body portion 21 and the side wall of the synchronizing gear housing 8. The side seal 55 is of such circumferential extent as to be constantly engaged with at least one of the teeth of the fixed gear 5. Beyond the end of the fixed gear 5 in the direction toward the shaft 6, the side seal 55 passes through a conforming aperture in the seal plate 25 in which it is slidably engaged for longitudinal movement, and its free end extends into the housing 8. The free end of the side seal 55 is secured by bolts 56 to the side seal positioning yoke 57 (see Fig. 16), which is, in turn, secured and positioned by the yoke positioning rods 58—58. The yoke positioning rods 58—58 pass through holes 59—59 in the seal plate 20 and are fixedly attached to the movable seal plate 31 and yoke 57 by threaded portions and nuts 64. The smaller 60 of the two intersecting cylinders is of the same diameter as the maximum diameter of the longitudinal movable pump gear 4 and is positioned so that it completely fills the void space left in the body portion of the pump when the horizontally movable pump gear is forced in the direction of the drive shaft as described above. To permit the transfer of fluid between the synchronizing gear housing 8 interior and the interior of the seal carriage housing 47 caused by changes in the volume of fluid within these two cavities by movement of the seal carriage 44, a longitudinal hole 61 has been provided in the longitudinally fixed pump gear 5 and shaft 12. Weep holes 61A are provided at the inner end of the hole 61, thus providing a duct betweeen the two cavities. Bolted end plates are provided for the primary unit A, a bearing cover plate and seal 62 is provided at the drive shaft end, and a seal carriage housing plate 63 is provided to complete the seal carriage cavity within the seal carriage housing 47. The seal carriage housing plate 63 has fixedly attached therein the cylinder tube 37 with provisions for a pipe connection for the pipe P1, also fixedly attached to the plate 63 is a fluid replenishing pipe P2. The control functions and piping connections will be hereinafter described.

The gear pump body portion 21 of the primary unit A has a gear pump cavity 65 (see Fig. 13), wherein the longitudinally movable pump gear 4 and longitudinally fixed pump gear 5 rotate. The cooperation of the gear 4 and gear 5, and the side walls of the cavity 65 and side seal 55 actually divide the gear pump cavity into two cavities, an upper or low pressure cavity 66, and a lower or high pressure cavity 67. In the embodiment illustrated, the primary unit A is coupled to a one directional prime mover, generally designated C, that furnishes torque power to rotate the longitudinally movable pump gear 4 in a clockwise direction and the longitudinally fixed pump gear 5 in a counter-clockwise direction by way of mechanisms as described above. The fluid follows the path as indicated by arrows (see Fig. 13), and is discharged under pressure through a semi-circular outlet orifice 68 in the bottom of the primary unit A, to return, as will hereinafter be described, to the primary unit through a semi-circular inlet orifice 69 in the bottom of the primary unit and be conducted by way of a duct 70 to the low pressure cavity 66 of the body portion 21. A barrier 71 separates the duct 70 from the high pressure cavity 67 of the gear pump body portion 21. The barrier has a concave surface 72 on the portion of the barrier that comes adjacent to the longitudinally movable pump gear 4. It can readily be observed from the illustrations (see Fig. 13), that fluid entrapped in the cavities between the teeth of the pump gears is transferred from the low pressure cavity 66 to the high pressure cavity 67 of the gear pump when the gears are rotated by a rotating power source. An inherent characteristic of gear pumps is the pulsating pressures present in the fluid being discharged from the pump. To overcome this non-desirable characteristic, I have incorporated a high pressure dampening chamber 75 which is attached to and is part of the body portion 21 of the primary unit A. An orifice 76 connects the dampening chamber 75 to the high pressure cavity 67 to permit the fluid under varying pressure to flow into and out of the dampening chamber 75. The dampening effect is obtained by the compression and expansion of a body of air 77 that is entrapped in the upper portion of the dampening chamber (see Fig. 13). A filling tube 78 and plug 79 are provided to permit initial charging and replenishing of the fluid in the primary unit A. Under certain conditions of operation, for instance, where the prime mover C is being used to impose a load on the primary unit A to assist in the retarding of a vehicle when bringing the vehicle to a stop, or where the vehicle is travelling down an incline, the secondary unit B or units act as gear pumps, and during the retarding period the normally low pressure cavity 66 becomes a high pressure cavity and pulsating pressure is impressed on the fluid within the cavity 66 by the gear pump action of the secondary unit B or units. To overcome this undesirable condition, I have incorporated a low pressure damping chamber 80, which is attached to and is part of the body portion 21 of the primary unit A. An orifice 81 connects the damping chamber 80 to the low pressure chamber 66 of the gear pump body portion 21 to permit the fluid under varying pressure to flow into and out of the damping chamber 80. The damping effect is obtained by the compression and expansion of a body of air 82 that is entrapped in the upper portion of the damping chamber 80 (see Fig. 13). A filling tube 83 and plug 84 are provided to permit initial charging and replenishing of the fluid in the primary unit A.

The semi-circular outlet orifice 68 and semi-circular inlet orifice 69 located in the lower portion of the gear pump body portion 21 and divided by the barrier 71 have positioned across their openings a reversing valve (see Figs. 10, 13 and 17).

*Secondary unit*

The secondary unit B, which is essentially a gear motor in the embodiment shown in Figs. 1 and 5, is securely fastened to the primary unit A by bolted flanges 1 and 2 and securing bolts 3, as described above. A semi-circular lower cavity orifice 88 and a semi-circular upper cavity orifice 89 are positioned adjacent to the inlet orifice 69 and outlet orifice 68 of the primary unit. However, the barrier wall 90 that divides the orifice 88 and inlet orifice 89 of the secondary unit B, is positioned at right angles to the barrier 71 between the orifice 68 and orifice 69 of the primary unit A (see Figs. 10, 13, and 17). The reversing valve 87 is positioned by and free to be rotated in companion annular rabbets 91 and 92 in the surfaces of the flanges 1 and 2 respectively. A control shaft 93, with an operating lever 94, extends upward through the barrier 90 in the secondary unit (see Figs. 10 and 13), and is fixedly attached to the reversing valve 87 by the threaded portion and nuts 95. The disk reversing valve 87, control shaft 93, and operating lever 94 are part of the manual control of the primary unit A. When the disk reversing valve 87 is manually positioned, as shown in Fig. 17, fluid under pressure from the high pressure cavity 67 of the primary unit A passes down through the high pressure opening 96 in the reversing valve 87 into the upper cavity 98 of the secondary unit B (see Fig. 10), and the vehicle is driven forward, as will hereinafter be described. After having dissipated its energy in driving the secondary unit B, the fluid returns to the low pressure cavity 66 of the primary unit A by way of the low pressure opening 97 in the reversing valve 87 and duct 70. When the reversing valve 87 is manually positioned, as shown in Fig. 18, fluid under pressure from the high pressure cavity 67 of the primary unit A passes down through the high pressure opening 96 in the reversing valve 87 and dividing on each side of the barrier 90 in the secondary unit B returns to the primary unit A by way of the low pressure opening 97 in the reversing valve 87 and duct 70. As the fluid freely flows through the secondary unit when the reversing valve 87 is in the position as shown in Fig. 18, no motive effort is impressed on the secondary unit motor gears. The reversing valve is manually positioned, as shown in Fig. 18, when the vehicle is being started, when testing operations are being performed on the prime mover C, or when it is desirable to move the vehicle or permit the vehicle to proceed on its own momentum. When the reversing valve 87 is manually positioned, as shown in Fig. 19, fluid under pressure from the high pressure cavity 67 of the primary unit A passes down through the high pressure opening 96 in the reversing valve 87 into the lower cavity 99 of the secondary unit by way of the duct 100 and ports 101—101 (see Figs. 10 and 13), and the vehicle is driven in a reverse direction or backed up, as will hereinafter be described. After having dissipated fluid pressure in driving the motor gears of the secondary unit B, the fluid returns to the low pressure cavity 66 of the primary unit by way of the low pressure opening 97 in the reversing valve 87 and duct 70. The secondary unit body portion 102 has contained therein a rotatably mounted gear motor comprised of closely cooperating fluid pressure gears 105 and 106. The gears are retained in rotating synchronism with each other by synchronizing gears 107 and 108, which are fixedly mounted on shafts 109 and 110 respectively, to which the fluid pressure gears 105 and 106 are also fixedly attached. The shaft 110 to which the fluid pressure gear 106 and synchronizing gear 108 are fixedly attached is rotatably mounted on bearings (not shown) located within the bearing housings 111 and 112, which are a part of the secondary unit housing 102. An extension of the shaft 110 projects through a seal plate 113 on the bearing housing 111 to provide a torque power source for the traction elements of the vehicle. The body portion 102 of the secondary unit B is provided with a cover plate 114 secured by bolts 115. The body portion 102 is also provided with a gear end sealing plate 117 secured to an internal flange 118 by securing bolts 119. Holes 120 are provided in the gear end sealing plate 117 for the shafts 109 and 110. The hole 120 for shaft 110 is shown in Fig. 10. The fluid pressure gears 105 and 106 fit snugly between the gear end sealing plate 117 and the barrier 90 of the secondary unit body portion 102 and cooperating with each other and concave portions 122 and 123 (see Fig. 13), of the body portion side walls to form a fluid pressure barrier that divides the gear motor cavity 124 of the secondary unit into an upper cavity 98 and a lower cavity 99. When fluid under pressure enters the gear motor cavity 124 by way of the reversing valve 87, as described above, and with the reversing valve 87 in the position shown in Fig. 17, the fluid under pressure enters the upper cavity 98 to cause rotation of the fluid pressure gears 105 and 106 in the direction as indicated by the arrows (see Figs. 10 and 13). After the fluid passes around the gears, it collects in the lower cavity 99 of the secondary unit B, passes through the ports 101—101 in the barrier wall 90, and up through the duct 100 to return to the primary unit A by way of the low pressure opening 97 in the reversing valve 87. When the reversing valve 87 is in the position shown in Fig. 19, the fluid under pressure enters the lower cavity 99 of the secondary unit B, as indicated by dotted arrows, by way of the duct 100 and ports 101—101 to impose fluid pressure on the fluid pressure gears 105 and 106 and causes the gears 105 and 106 to rotate in the reverse direction (see dotted arrows Fig. 13). The fluid pressure imposed on the fluid pressure gears 105 and 106 is thus converted into rotary torque power in the shaft 110 for use by the traction elements of the vehicle to drive the vehicle in either a forward or reverse direction, dependent on the position of the reversing valve 87.

*Primary unit control*

The controls for the primary unit are semi-automatic hydraulic devices connected to obtain automatic positioning of the longitudinally movable pump gear 4 and longitudinally movable seal 43 under varying conditions of load imposed on the primary unit. The positioning of the gear 4 and seal 43 determines the mechanical advantage that the primary unit A has over the secondary unit B or units.

A prime mover, generally designated C, has its drive shaft 127 coupled to the driving shaft 6 of the primary unit A by the coupling 128 (see Fig. 30). When the prime mover is being activated by the operator of the vehicle, the operator, by way of rod 130, clevis 131, lever 94, and shaft 93, positions the reversing valve 87 in the (idling) position shown in Fig. 18. With the reversing valve 87 in this idling position, the prime mover shaft is free to rotate at any speed without imposing fluid pressure on the secondary unit B, as described above. When the operator has throttled the prime mover C down to an idling speed, the reversing valve 87 is moved by means described above to the (forward) position shown in Fig. 17, or to the (reverse) position shown in Fig. 19 After starting the prime mover and positioning the reversing valve 87 for the direction in which he wishes to proceed, the application of power to the traction elements of the vehicle by way of the primary unit A and secondary unit B, is directly proportional to the speed at which the prime mover C rotates. That is to say, the throttle on the prime mover is the only control necessary once the prime mover is activated and the direction of travel is established. With the reversing valve in either position, fluid pressure is built up in the high pressure cavity 67 of the primary unit A. The fluid pressure thus built up causes the fluid to pass through the orifice 76 into the high pressure dampening chamber 75, through the pipe P4, pipe P5, and on to the automatic idling valve AV, through the pipe P6 to the low pressure damping chamber 80, through the orifice 81 to the low pressure cavity 66, thus completing the cycle. The fluid continues to flow as described above, as long as the prime mover A remains at an idling speed. The position of the reversing valve 87 determines the direction of travel. The functioning of the controls as hereinafter described for the primary unit are the same regardless of the direction in which the vehicle is travelling.

As the speed of the prime mover is increased, more fluid tends to flow from the high pressure cavity 67 to the low pressure cavity 66 of the primary unit A by way of the automatic idling valve AV as described above. As the outlet orifice 132 from the valve cylinder 133 is smaller than the inlet orifice 134 of the automatic idling valve AV, the outlet orifice 132 acts as a constriction and a fluid pressure is built up in the pipe P5. This fluid pressure is transmitted to the fluid in the bypass port 135 and tension spring tube 136 and impinges on the radial vane 137 of the rotating valve 138. As long as the idling speed of the prime mover C and of the rotating speed of the fluid pressure gears 4 and 5 remains below a predetermined speed, the valve remains open (as shown in Fig. 3), and the fluid leaves the cylinder 133 by way of the outlet port 129 and outlet orifice 132. The valve is held in the open position by the helical tension spring 139. However, as the prime mover C and fluid pressure gears 4 and 5 rotate faster than a predetermined rotating speed, the difference of pressure between the inlet orifice 134 and outlet orifice 132 of control valve becomes great enough so that the pressure imposed on the radial vane 137 is enough to overcome the helical tension spring 139 and rotate the rotary member 138 and move the outlet port 129 out of alignment with the outlet port 132 to close the valve AV (see Fig. 2). After the latter takes place, the automatic valve AV remains closed until the fluid pressure in the high pressure cavity 67 of the primary unit A drops to a predetermined pressure. To prevent rupturing of the hydraulic piping and connected devices upon the development of excessive pressure in the high pressure cavity 67, a pressure relief valve V-REL has been connected in the piping system. Should the pressure in the high pressure cavity 67 exceed a predetermined value, the pressure relief valve V-REL, a spring loaded device, will open and permit fluid pressure relief by way of the pipe P4, pipe P5, pipe P5A, pressure relief valve V-REL, pipe P15A, bypass 6A in the automatic valve AV, and pipe P6, and so to the low pressure cavity 66 by way of the low pressure damping chamber 80 and orifice 81, thus insuring that pressures built up in the high pressure cavity 67 will not exceed a predetermined value.

As the fluid pressure gears 4 and 5 of the primary unit A rotate, driven by the prime mover C, as described above, the fluid pressure built up in the high pressure cavity 67 of the prime mover A is transmitted through the orifice 76, high pressure dampening chamber 75, pipe P7, and pipe P8 to a brake actuated valve BV (see Fig. 5). The brake actuated valve BV (see Figs. 5, 6, and 7), and shown in the position in which it would be when activated by application of the brakes of the vehicle, is a lever operated bypass valve having a body portion 140 enclosing a rotary member 141 which is position controlled by an operating lever 142. The operating lever 142 is pivotally attached at 143 to an operating rod 144. The operating rod is attached to spring loaded piston and hydraulic cylinder (not shown) or to a linkage on the brake system (not shown) of the vehicle. When the controls are set to move the vehicle in either a forward or a reverse direction and the brake of the vehicle is off, the operating rod 144 positions rotary member 142 of the brake actuated valve BV, permitting fluid under pressure to flow from pipe P8 to pipe P1 (see Fig. 7). When the braking system of the vehicle is activated, the operating rod 144 moves the rotary member 142 of the brake actuated valve BV so that pipe P10 is connected to pipe P1. When the vehicle is getting under way, fluid under pressure from the pipe P8, as described above, passes through the brake actuated valve BV to flow into pipe P1 (see Fig. 5), and thus to the cylinder tube 37 to be impressed on the end of the piston combination 38 (see Fig. 11), to force the longitudinally movable pump gear 4 through the longitudinally fixed seal 24 and the longitudinally fixed pump gear 5, compressing the helical compression spring 17 and reducing the area of the pump gears presented to the fluid in the gear pump chamber, thereby increasing the mechanical advantage that the primary unit A has over the secondary unit B. After the vehicle is in motion and the initial effort requirement is over, the pressure in the high pressure cavity 67 of the primary unit A reduces, resulting in a reduction of pressure on the end of the piston combination 38. This reduction in pressure permits the helical compression spring 17 to move the longitudinally movable pump gear and longitudinally fixed pump gear seal to a position best suited to the load being imposed on the primary unit A by the the secondary unit B. The piston 38 and the spring 17 thus balance each other to maintain a pump gear face in the primary unit best suited to the load imposed on the primary unit A.

When the vehicle is being retarded, the secondary unit B tends to act as a gear pump, as described above, and the normally low pressure cavity 66 of the primary unit A becomes a high pressure cavity. Should the operator activate the vehicles braking system during this time, the operating rod 144 will rotate the rotary member 141 of the brake activated valve to connect pipe P10 to pipe P1, fluid pressure from the cavity 66 will then flow through the orifice 81, damping chamber 80, pipes P11 and P10, brake valve BV, and pipe P1 to be impressed on the piston combination 38 and move the longitudinally movable pump gear 4 and longitudinally fixed seal 24, as described above, to reduce the mechanical advantage that the secondary unit B has over the primary unit A, and thus impose a greater load on the secondary unit B and assist in retarding the vehicle.

As the fluid entrapped between the teeth of the longitudinally movable pump gear 4 and the concave surface of the barrier 71 forming a cavity 146 (see Fig. 13), would prevent free longitudinal movement of the gear 4 under the influence of fluid pressure by way of piston 38, as described above, a system of piping employing a dual check valve DCV1 is incorporated to automatically permit the entrapped fluid to flow from the cavity 146 and also to automatically replenish the fluid within the cavity 146 when the longitudinally movable pump gear is moving under the influence of the helical compression spring 17. The cavity 146 is connected to a dual check valve DCV1 by way of an orifice 147 in the movable seal plate 31, the equalizer pipe bore 50 in the seal carriage 44, fluid relief and replenishing pipe P2, passage 148 through the seal carriage housing plate 63, and pipe P12 to dual check valve DCV1. The dual check valve DCV1 (see Figs. 8 and 9), is a combination unit comprised of a housing 150 containing two ball check valves. The inlet ball check 151 operates in the bore 152 and is held in position by the helical spring 153 against the orifice 154. The outlet ball check 155, operating in the bore 156, is held in position by helical spring 157 against the orifice 158. The dual check valve DCV1 permits fluid under pressure to enter the center bore 159 by way of the inlet ball check 151 and to leave by way of the outlet ball check 155, but prevents flow of the fluid in the opposite direction. The pipe P12 is connected to the center bore 159 of the dual check valve by the port 160. A pipe P14 connected to the low pressure damping chamber 80 of the gear pump body portion 21 by way of pipe P11 conducts fluid to the inlet ball check 151 of the dual check valve DCV1 (see Fig. 5). A second pipe P13 connected to the high pressure dampening chamber 75 of the gear pump body portion 21 by way of pipe P7 conducts fluid from the outlet ball check 155 of the dual check valve to the high pressure dampening chamber 75. When the longitudinally movable pump gear 4 moves in the direction of the longitudinally fixed seal 24 propelled by fluid pressure on the piston 38, as described above, and thus shortening the cavity 146, the entrapped fluid flows out through the pipes P2 and P12 through the outlet ball check 155 in the dual check valve DCV1 to the pipe P13 and pipe P7 to the high pressure dampening chamber 75 of the gear pump body portion 21. When the longitudinally movable pump gear 4 moves in a direction away from the longitudinally fixed seal 24 propelled by the helical compression spring 17, as described above, thus lengthening the cavity 146, the entrapped fluid is replenished by fluid that flows from the low pressure damping chamber 80 in the gear pump body portion 21, through pipe P11, pipe P14, inlet ball check 151 of the dual check valve DCV1 to pipe P12 and P2 to the cavity 146, thus replenishing the fluid in the cavity 146. The dual check valve DCV1 and piping thus permit discharging and replenishing of the entrapped fluid and free longitudinal movement of the longitudinally movable pump gear 4.

The fluid entrapped between the teeth of the longitudinally fixed pump gear 5 and the concave surface of the longitudinally fixed pump gear side seal 55, when two teeth of the gear 5 are adjacent to the side seal 55, would also prevent free longitudinal movement of the longitudinally fixed pump gear seal 43 under the influence of fluid pressure by way of the piston 38, as described above. A system of piping employing a dual check valve DCV2 is incorporated to automatically permit the entrapped fluid to flow from the above described cavity, and also automatically replenish the fluid within the cavity when the longitudinally movable pump gear seal 43 is moving under the influence of the helical compression spring 17. The cavity, as described above, is connected to a dual check valve DCV2 by way of a fluid relief and replenishing pipe P3 (see Figs. 11 and 15). The dual check valve DCV2 is identical in construction and function to the dual check valve shown in Figs. 8 and 9. The fluid relief and replenishing pipe P3 is connected to a center bore in the dual check valve DCV2 by way of a port. A pipe P15, connected to the low pressure damping chamber 80 of the gear pump body portion 21 by way of the automatic valve AV and pipe P6 (see Fig. 1), conducts fluid to the inlet ball check of the dual check valve DCV2. A second pipe P16, connected to the high pressure dampening chamber 75 of the gear pump body portion 21 by way of the pipe P4, conducts fluid from the outlet ball check of the dual check valve DCV2 to the high pressure dampening chamber 75. When the longitudinally movable seal moves across the face of the longitudinally fixed pump gear 5, propelled by the fluid pressure on the piston 38, as described above, and thus shortening the cavity between the teeth of the longitudinally fixed pump gear 5 and the pump gear side seal 55, the entrapped fluid within the cavity flows out through the pipe P3, through the outlet ball check in the dual check valve DCV2, through pipe P16, through the pipe P4 to the high pressure chamber 75 of the gear pump body portion 21. When the longitudinally fixed pump gear seal 43 moves in a direction away from the seal plate 20 propelled by the helical compression spring 17, thus lengthening the cavity, as described above, the entrapped fluid in the cavity is replenished by fluid from the low pressure damping chamber 80 in the gear pump portion 21 by way of the pipe P6, bypass duct P6A in the automatic valve AV, pipe P15, and inlet ball check in the dual check valve DCV2. The dual check valve and piping thus permit escapement and replenishing of the entrapped fluid and free longitudinal movement of the longitudinally movable seal 43.

In the foregoing description, a close-coupled primary and secondary unit is described in the application of any improved variable ratio power transmission mechanism to a power driven vehicle. The close coupled units A and B are used in place of the conventional gear transmission unit or fluid drive unit, as illustrated in Fig. 30. In the application illustrated in Fig. 30, wherein only the driving and running gear elements of the vehicle are shown, a prime mover unit with a drive shaft 127 is coupled to the drive shaft 6 of the primary unit A by the coupling 128. The secondary unit B is coupled to a torque shaft 163 by way of a universal coupling 164. The torque shaft is connected to and drives the traction elements E—E by way of a differential unit D and drive axles 165—165. The forward end of the vehicle is supported by the axle 166 and rotating support elements F—F.

In the application of any improved variable power transmission mechanism, as illustrated in Fig. 31, the primary unit A and two secondary units B1 and B2 are used in place of the conventional transmission or fluid drive units and differential unit. In this application, a primary adapter unit, generally designated G, interconnecting piping, as described hereinafter, and secondary adapter units, generally designated H—H, are interposed between the primary unit A and secondary units B1 and B2. The primary adapter unit G (see Figs. 21, 22, and 23), having a body portion 170 fitted with a flange unit 2A is adapted to be secured to the flange 1 of the primary unit. The body portion 170 is divided into compartments 171 and 172 by a barrier 173. A reversing valve 87A, identical to the reversing valve 87, as described above, is rotatably positioned between the flanges 1 of the primary unit A and flange 2A on the primary adapter unit G in an annular rabbet 91 in the primary unit and 92A in the adapter unit G. The reversing valve 87A is fixedly attached to a shaft 93A that extends upward through the barrier 93A in the primary adapter unit G, and is actuated by the operating lever 94A. A high pressure opening 96A and a low pressure opening 97A are provided on the reversing valve 87A to permit fluid under high pressure to flow from the high pressure cavity 67 of the primary unit A into the compartment 171 or 172 of the adapter unit G, dependent on the position of the reversing valve 87A, and to permit fluid to flow from the compartment 171 or 172 of the adapter unit G to the low pressure cavity 66 of the primary unit A, dependent on the position of the reversing valve 87A. When the reversing valve 87A is positioned as illustrated in Fig. 21, and the vehicle is travelling in a forward direction, fluid under high pressure flows from the high pressure cavity 67 of the primary unit A through the high pressure opening 96A in the reversing valve 87A into the compartment 172 of the adapter unit G, thence to the pipes P17A and P17B and secondary adapter units, generally designated H1—H1, thereinafter described, to the upper cavities 98 of the secondary units B1 and B2 which have their drive shafts 110, 110 coupled to the traction elements E1 and E2 respectively of the vehicle. After expending fluid pressure energy to drive the fluid pressure gear 105 and 106 in the secondary units B1 and B2 and connected traction elements E1 and E2 respectively of the vehicle, the fluid returns by way of the secondary adapter units H1 and H2 and pipes P18A and P18B respectively, to the cavity 171 of the primary adapter unit G, and thence to the low pressure opening 97A in the reversing valve 87A. The secondary unit adapter H (see Figs. 24 and 25), is comprised of a body portion 175, containing a compartment 176 and 177 separated by a barrier 178. The secondary adapter unit H is adapted to be securely fitted to the flange 2 of the secondary unit B1 and B2 by the flange 179 and securing bolts (not shown), a boss 181 on the flange 179 interfits with the annular rabbet 92 in the flange 2 of the secondary units B1 and B2. The control and control functioning of the primary unit A for the application shown in Fig. 31 are the same as those described for the close coupled primary and secondary units as shown in Figs. 1 and 30. The main difference in the application shown in Fig. 31 is that two secondary units B1 and B2 are employed, and that the fluid is conducted between the primary unit A and secondary units B1 and B2 by way of the pipes P17A, P17B, P18A, P18B, and adapters G and H, as above described. In the illustration Fig. 31, arrows have been shown to indicate the flow of the fluid in the pipes when the vehicle is being propelled in a forward direction, and dotted arrows are shown to indicate the flow of the fluid in the pipes when the vehicle is being propelled in a reverse direction.

In the application of my improved variable power transmission mechanism, as illustrated in Fig. 32, the primary unit A and two secondary units B3 and B4 are used in place of the conventional transmission or fluid drives and differential unit. In this application, an adapter unit H, identical in construction to the adapter unit H illustrated in Figs. 24 and 25, is fixedly attached to the flange 1 of the primary unit by flange 179A and boss 181A, and securing bolts (not shown). In this manner, the high pressure cavity 67 of the primary unit A is extended for connection to the pipe P19 (see Fig. 32), and the low pressure cavity 66 of the primary unit A is extended for connection to pipe P26. The pipe P19 is, in turn, connected to the check valve CKV1. From the check valve CKV1, fluid under high pressure is conducted by the pipe P20 and P20B to two adapter units managed as a reversing control unit, generally designated I (see Figs. 26 and 27). The reversing control unit I is comprised of an upper unit J (see Figs. 28 and 29), similar in construction to the secondary adapter unit H, except that an annular rabbet 181A is provided to form a recess for a reversing valve 87B. The lower half of the reversing control unit I is a primary unit adapter complete with reversing valve 87B, shaft 93A, and operating lever 94A. The two units are securely fastened together by bolts (not shown) in the flanges 179A and 2A. When the vehicle is being propelled in a forward direction, fluid under pressure enters the reversing control unit I from the pipe P20B, and with the reversing valve 87A positioned for forward direction of the vehicle, the fluid under pressure passes through the high pressure opening 96A in the reversing valve 87A, through the high pressure compartment 172A of the adapter G1, and into the pipe P21 to the secondary unit B3 and pipe P22 to the secondary unit B4 by way of the secondary adapter units H3 and H4 respectively. After the fluid pressure has been expended in driving the secondary units B3 and B4, the fluid returns to the primary unit as follows: From the secondary units B3 and B4, the fluid flows through the pipes P23 and P24 respectively (see Fig. 32), to the reversing control unit I (see Fig. 26), through the low pressure compartment 171A of the adapter G, through the low pressure opening 97A in the reversing valve 87A and on into the pipe P25B and P25 to the check valve CKV2. From the check valve CKV2, the return fluid flows through pipe P26 to the low pressure cavity 66 of the primary unit A by way of the adapter H. The control and control functions of the primary unit A for the application shown in Fig. 32 are the same as those described above for the primary and secondary units shown in Fig. 30, the main difference being that the reversing control unit I is remotely positioned in respect to the primary unit A and interconnecting piping containing check valves CKV1 and CKV2 are interconnected between the primary unit A and reversing control unit I. In the application shown in Fig. 32, the check valves are incorporated into the piping system to give the operator an additional control to prevent the vehicle from moving due to the influence of an incline in a direction reverse to that in which the controls are set. The functioning of this added control feature is as follows: When the controls are set to permit the prime mover C to propel the vehicle in a forward or reverse direction, the check valves CKV1 and CKV2 prevent the fluid in the pipes P20, P20B, P25, and P25B moving in a reverse direction, and should the prime mover C stall or be stopped, the vehicle would not move in a direction in reverse of direction in which the prime mover was propelling it, and in which the controls are set. This feature is sometimes referred to as a "holding on a hill feature." Also in the application of my improved variable power transmission mechanism shown in Fig. 32, a "free wheeling" and service braking arrangement for the traction elements E3 and E4 has been incorporated in the piping system. The "free wheeling" feature permits the fluid being circulated by the secondary units B3 and B4 when the vehicle is coasting or moving under the influence of an incline, to circulate freely by way of the reversing control unit I in the pipes P25B and P25A, throttle valve TV, which remains open until the braking mechanism of the vehicle is activated, pipe P27, check valve CKV3, pipes P20A and P20B, thus permitting free movement of the vehicle. However, should the operator wish to retard or stop the vehicle, he closes the throttle valve TV by way of the braking mechanism on the vehicle, and in this way restricts the free flow of the fluid as described above. The restricting of the fluid flow creates a braking effect on the traction elements, and should the operator desire to bring the vehicle to a stop, it is only necessary for him to completely close the throttle valve TV. With the arrangement of the check valve CKV3 and throttling valve TV, as above described, it can readily be observed that the piping connections and devices provide a free wheeling and braking feature to which my improved variable power transmission is applied.

In the illustration, Fig. 32, arrows have been shown to indicate the flow of the fluid in the pipes when the vehicle is being propelled in a forward direction and dotted arrows are shown to indicate the flow of the liquid in the pipes when the vehicle is being propelled in a reverse direction.

In the application of my variable power transmission mechanism as illustrated in Fig. 33, the primary unit A and four secondary units B5, B6, B7, and B8 replace the conventional dual transmissions or fluid drive units and dual differential units. In this application, a primary adapter unit G, interconnecting piping, and secondary adapter units H5, H6, H7, and H8 are interposed between the primary unit A and secondary units B5, B6, B7, and B8. The primary adapter unit G, as described above, and illustrated in Figs. 21, 22, and 23, is fitted to and secured to the flange 1 of the primary unit A. When the reversing valve 87A of the primary adapter unit G is positioned as illustrated in Fig. 21, and the vehicle is travelling in a forward direction, fluid under high pressure flows from the high pressure cavity 67 of the primary unit A down through the high pressure opening 96A in the reversing valve 87A into the compartment 172 of the primary adapter unit G, thence by way of pipes P28 and P28A to a secondary unit B5. A second pipe P28B, connected to the pipe P28, conducts fluid under high pressure into the upper cavity in the secondary unit B6 by way of the secondary adapter unit H6. A companion pipe P29 is also connected to the primary adapter unit G, and this pipe also conducts fluid under high pressure by way of pipe P29A to the upper cavity of the secondary unit B7 by way of the secondary adapter unit H7. A fourth pipe P29B is connected to pipe P29, and fluid under high pressure is conducted by pipe P29B to the upper cavity in the secondary unit B8 by way of the secondary adapter unit H8. The secondary adapter units H5, H6, H7, and H8 are identical in construction to the secondary adapter unit H, as described above, and as illustrated in Figs. 24 and 25. The secondary units B5, B6, B7, and B8 have their drive shafts directly connected to the traction elements E5, E6, E7, and E8 respectively, of the vehicle. After expending fluid pressure energy to drive the fluid pressure gears in the secondary units B5, B6, B7, and B8, and connected traction elements of the vehicle, the fluid returns by way of the secondary adapter units H5, H6, H7, and H8 respectively, and interconnecting pipes P30, P30A, P30B, P31, P31A, P31B to the cavity 172 of the primary adapter unit A by way of the low pressure opening 96A in the reversing valve 87A.

In the illustration, Fig. 33, arrows have been shown to indicate the flow of the fluid in the pipes when the vehicle is being propelled in a forward direction, as described above, and dotted arrows are shown to indicate the flow of the liquid in the pipes when the reversing valve 87A is positioned in a position corresponding to that shown for the reversing valve 87 in Fig. 19, and the vehicle is travelling in a reverse direction.

Although my invention has been described in considerable detail, such description is intended as being illustrative rather than limiting, since the invention may be variously embodied, and the scope of the invention is to be determined as claimed.

I claim as my invention:

1. In a hydraulic transmission, a variable volume gear pump including a longitudinally slidable pump gear on a driving shaft, a second shaft parallel to said driving shaft, a longitudinally fixed pump gear on said second shaft rotatably meshing with said slidable gear, a seal carriage longitudinally slidable with said slidable gear, a first rotatable relatively thin seal mounted in said carriage for rotation coaxially with said fixed gear and having a surface conforming to and slidably engageable with the periphery of said fixed gear so that said fixed gear is extendable therethrough, a transverse fixed seal plate abutting one end of such fixed gear, a second rotatable relatively thin seal mounted in said seal plate for rotation coaxially with said slidable gear and having a surface conforming to and slidably engageable with the periphery of said slidable gear so that said slidable gear is extendable therethrough, said first rotatable seal and said seal plate respectively being disposed relatively toward opposite ends of said fixed gear, a longitudinally slidable side seal secured at both its ends to said carriage for longitudinal movement therewith and having a cylindrical inner surface interfitting with the maximum radius of said fixed gear, said slidable side seal being of such circumferential extent as to be constantly engaged with at least one of the teeth of said fixed gear and disposed entirely on the side thereof opposite said slidable gear and between said first rotatable seal and said seal plate, said seal plate extending a substantial radial distance beyond said slidable side seal which extends through and slidably engages the sides of a conforming aperture in said seal plate, and means to permit flow of fluid out of the cavity defined by said slidable side seal and the space between adjacent fixed gear teeth while they are in engagement with said slidable side seal when said seal carriage is moved toward said seal plate, and into said cavity when said seal carriage is moved away from said seal plate.

2. The invention of claim 1 including spring means urging said slidable gear into maximum surface engagement with said fixed gear.

3. The invention of claim 1 including a fixed side seal having a cylindrical inner surface of radius equal to the maximum radius of said slidable gear, said fixed side seal being of such circumferential extent as to be constantly engaged with at least one of the teeth of said slidable gear and disposed entirely on the side thereof opposite the fixed gear and between said second rotatable seal and said seal carriage, and means to permit flow of fluid out of the cavity defined by said fixed side seal and the space between adjacent slidable gear teeth while they are in engagement with said fixed side seal when said seal carriage is moved toward said seal plate, and into said cavity when said seal carriage is moved away from said seal plate.

References Cited in the file of this patent

UNITED STATES PATENTS

| Number | Name | Date |
|---|---|---|
| 788,848 | Riegel | May 2, 1905 |
| 815,522 | Fraser | Mar. 20, 1906 |
| 1,172,412 | Von Saafeld | Feb. 22, 1916 |
| 1,742,215 | Pigott | Mar. 29, 1927 |
| 2,052,419 | Moore et al. | Aug. 25, 1936 |
| 2,149,326 | Wilkin | Mar. 7, 1939 |
| 2,257,724 | Bennetch | Oct. 7, 1941 |
| 2,342,002 | Merrell | Feb. 15, 1944 |
| 2,526,830 | Purcell | Oct. 24, 1950 |
| 2,536,486 | Berry | Jan. 2, 1951 |
| 2,600,477 | Burt | June 17, 1952 |
| 2,633,806 | Perkins | Apr. 7, 1953 |
| 2,638,848 | Johnson | May 19, 1953 |
| 2,645,903 | Elkins | July 21, 1953 |
| 2,666,293 | Vigneau | Jan. 19, 1954 |
| 2,684,636 | Heldenbrand | July 27, 1954 |

FOREIGN PATENTS

| Number | Country | Date |
|---|---|---|
| 117,929 | Sweden | Jan. 7, 1947 |
| 672,946 | France | Sept. 24, 1929 |
| 801,187 | Germany | Dec. 28, 1950 |
| 1,125,992 | France | July 23, 1956 |